United States Patent
Takata et al.

(10) Patent No.: US 12,508,538 B2
(45) Date of Patent: Dec. 30, 2025

(54) HYDROGEN SEPARATION FILTER

(71) Applicant: TOYOTA JIDOSHA KABUSHIKI KAISHA, Toyota (JP)

(72) Inventors: Satoshi Takata, Toyota (JP); Tomonari Kogure, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 377 days.

(21) Appl. No.: 18/224,936

(22) Filed: Jul. 21, 2023

(65) Prior Publication Data

US 2024/0042378 A1 Feb. 8, 2024

(30) Foreign Application Priority Data

Aug. 8, 2022 (JP) .................................. 2022-126538

(51) Int. Cl.
   *B01D 53/22* (2006.01)
   *B01D 69/12* (2006.01)
   (Continued)

(52) U.S. Cl.
   CPC ....... *B01D 53/228* (2013.01); *B01D 69/1216* (2022.08); *C01B 3/505* (2013.01); *B01D 71/02231* (2022.08); *B01D 2257/108* (2013.01)

(58) Field of Classification Search
   CPC .............. B01D 53/228; B01D 69/1216; B01D 71/02231; B01D 2257/108; C01B 3/505
   See application file for complete search history.

(56) References Cited

U.S. PATENT DOCUMENTS 5,366,712 A * 11/1994 Violante ................ B01D 53/22
                                              423/248
6,152,987 A * 11/2000 Ma .......................... C01B 3/505
                                              95/56

(Continued)

FOREIGN PATENT DOCUMENTS

JP        H11-286785 A     10/1999
JP        2023-075887 A    5/2023
(Continued)

OTHER PUBLICATIONS

Aoki, Yuki; "Development of Hydrogen Recovery Technology from Steel Reproduction Gas using Pd—Ag Superlattice Nanothin Film"; Steel Foundation for Environmental Protection Technology Abstracts of Grant Research Results; Apr. 2014; pp. 65-66.

(Continued)

*Primary Examiner* — Anthony R Shumate
(74) *Attorney, Agent, or Firm* — Oliff PLC

(57) ABSTRACT

The hydrogen separation filter includes a porous substrate and a super lattice layer on the porous substrate. The super lattice layer includes at least one lattice expansion layer containing a first material and at least two hydrogen dissociation and permeation layers containing a second material selected from the group consisting of Pd, V, Ta, Ti, Nb, and alloys thereof. The at least one lattice expansion layer and the at least two hydrogen dissociation and permeation layers are alternately stacked. The first material and the second material have a same crystalline structure. A lattice constant $a_{1,bulk}$ of a first bulk material having a same composition and a same crystalline structure as the first material and a lattice constant $a_{2,bulk}$ of a second bulk material having a same composition and a same crystalline structure as the second material satisfy Formula (1):

$$1.03 a_{2,bulk} \leq a_{1,bulk} \leq 1.15 a_{2,bulk} \tag{1}.$$

8 Claims, 1 Drawing Sheet

(51) Int. Cl.
*C01B 3/50* (2006.01)
*B01D 71/02* (2006.01)

(56) References Cited

U.S. PATENT DOCUMENTS

| | | | |
|---|---|---|---|
| 6,913,736 B2* | 7/2005 | Alvin | C01B 3/16 96/11 |
| 11,472,701 B2* | 10/2022 | Kambara | C01B 3/50 |
| 2002/0048703 A1* | 4/2002 | Ohlsen | H01M 4/925 429/524 |
| 2003/0183080 A1* | 10/2003 | Mundschau | C01B 3/16 95/55 |
| 2004/0237779 A1 | 12/2004 | Ma et al. | |
| 2005/0061145 A1* | 3/2005 | Alvin | C01B 3/505 95/56 |
| 2005/0241477 A1 | 11/2005 | Mundschau et al. | |
| 2006/0201884 A1* | 9/2006 | Kulprathipanja | C10G 31/11 210/651 |
| 2007/0025909 A1* | 2/2007 | Krist | C10J 3/00 423/644 |
| 2007/0190302 A1 | 8/2007 | Maeda et al. | |
| 2010/0101419 A1* | 4/2010 | Hoshino | C01B 3/505 156/60 |
| 2011/0229379 A1* | 9/2011 | Way | B01D 65/108 95/55 |
| 2013/0152785 A1 | 6/2013 | Saukaitis | |
| 2015/0251905 A1* | 9/2015 | Elkind | C01B 3/501 422/162 |
| 2022/0127142 A1* | 4/2022 | Hill | B01D 71/02231 |
| 2023/0212008 A1 | 7/2023 | Takata et al. | |

FOREIGN PATENT DOCUMENTS

WO 2011/122414 A1 10/2011
WO 2015/023113 A1 2/2015

OTHER PUBLICATIONS

Shi, L. et al., "High-flux H2 separation membranes from (Pd/Au)n nanolayers," International Journal of Hydrogen Energy, vol. 36, pp. 2281-2284, 2011.

* cited by examiner

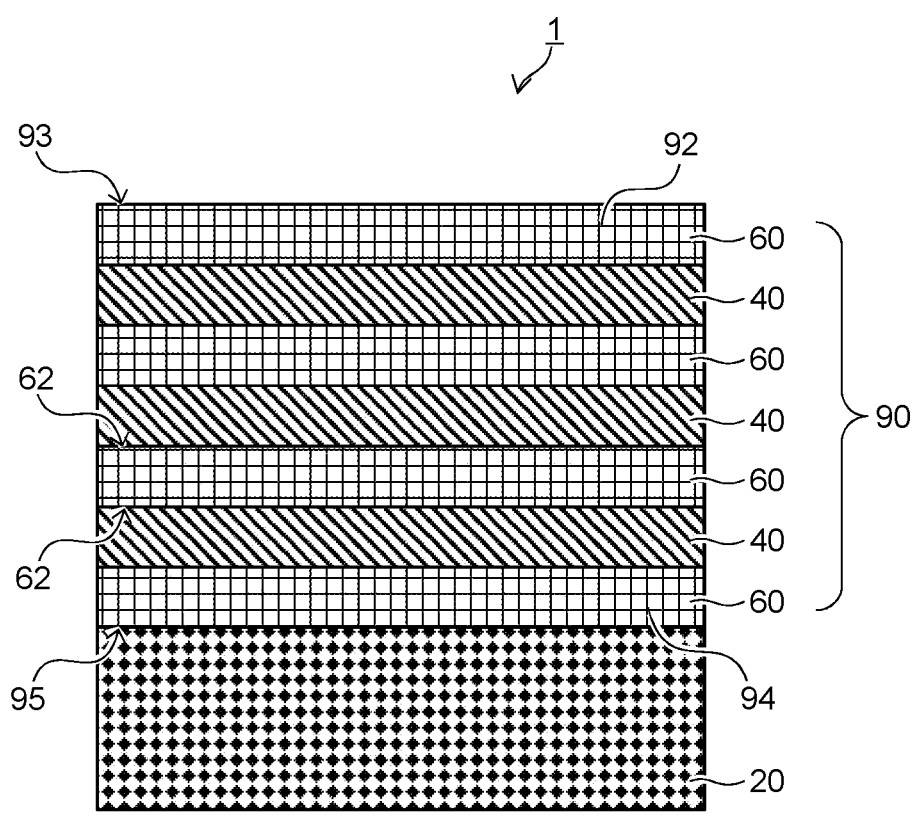

HYDROGEN SEPARATION FILTER

CROSS REFERENCE TO RELATED APPLICATIONS

The present application claims priority from Japanese patent application JP 2022-126538 filed on Aug. 8, 2022, the entire content of which is hereby incorporated by reference into this application.

BACKGROUND

Technical Field

The present disclosure relates to a hydrogen separation filter.

Background Art

As a hydrogen purification method, there has been known a membrane separation method using a metal film. WO 2011/122414 discloses a porous filter in which defects opened on one surface of a porous ceramic membrane is closed by a metal, and a hydrogen separation membrane in which a palladium thin membrane or a palladium alloy thin film is formed on the one surface of the porous filter.

SUMMARY

Examples of metal that allows selective permeation of hydrogen include palladium (Pd), vanadium (V), tantalum (Ta), titanium (Ti), and niobium (Nb). These metals easily embrittle in a hydrogen atmosphere. In order to reduce or prevent the embrittlement of these metals, the hydrogen separation membrane is generally used at a high temperature (for example, approximately 400° C.). However, hydrogen purification under a high temperature requires a large amount of energy.

The present disclosure provides a hydrogen separation filter that allows hydrogen purification at a lower temperature than a conventional one.

Aspects of the present disclosure include the followings.

1. A hydrogen separation filter includes a porous substrate and a super lattice layer on the porous substrate. The super lattice layer includes at least one lattice expansion layer containing a first material, and at least two hydrogen dissociation and permeation layers containing a second material selected from the group consisting of Pd, V, Ta, Ti, Nb, and alloys thereof. The at least one lattice expansion layer and the at least two hydrogen dissociation and permeation layers are alternately stacked. The first material and the second material have a same crystalline structure. A lattice constant $a_{1,bulk}$ of a first bulk material having a same composition and a same crystalline structure as the first material and a lattice constant $a_{2,bulk}$ of a second bulk material having a same composition and a same crystalline structure as the second material satisfy Formula (1):

$$1.03 a_{2,bulk} \leq a_{1,bulk} \leq 1.15 a_{2,bulk} \quad (1)$$

2. In the hydrogen separation filter according to Aspect 1, the super lattice layer includes an uppermost layer that is farthest from the porous substrate and a lowermost layer that is closest to the porous substrate, both of the uppermost layer and the lowermost layer being the hydrogen dissociation and permeation layers.

3. In the hydrogen separation filter according to Aspect 1 or 2, the second material has an average lattice constant a 2 satisfying Formula (2):

$$a_{2,bulk} < a_2 \quad (2),$$

the average lattice constant a 2 being determined from a plane spacing between crystal planes perpendicular to an interface between the lattice expansion layer and the hydrogen dissociation and permeation layer.

4. In the hydrogen separation filter according to any of Aspects 1 to 3, the second material has an average lattice constant a 2 satisfying Formula (3):

$$1.5 \leq [(a_2 - a_{2,bulk})/a_{2,bulk}] \times 100 \leq 5 \quad (3)$$

the average lattice constant $a_2$ being determined from a plane spacing between crystal planes perpendicular to an interface between the lattice expansion layer and the hydrogen dissociation and permeation layer.

5. In the hydrogen separation filter according to any of Aspects 1 to 4, each of the lattice expansion layers and the hydrogen dissociation and permeation layers has a thickness in a range of 1 nm to 10 nm.

6. In the hydrogen separation filter according to any of Aspects 1 to 5, the first material is Au, Au, or Al, and the second material is Pd.

7. In the hydrogen separation filter according to Aspect 6, the first material is Ag.

8. In the hydrogen separation filter according to any of Aspects 1 to 7, the super lattice layer has a thickness exceeding seven times an average pore diameter of the porous substrate.

The hydrogen separation filter of the present disclosure allows hydrogen purification at a lower temperature than a conventional one.

BRIEF DESCRIPTION OF THE DRAWINGS

FIG. 1 is a schematic cross-sectional view of a hydrogen separation filter according to an embodiment.

DETAILED DESCRIPTION

The following describes embodiments with reference to the drawings as appropriate. In the drawings referred in the following description, the same reference numerals may be used for the same members or the members having similar functions, and their repeated explanations may be omitted in some cases. For convenience of explanation, dimensional ratios and shapes of respective units in the drawings are exaggerated, and different from actual dimensional ratios and shapes in some cases. A numerical range expressed herein using the term "to" includes respective values described before and after the term "to" as the lower limit value and the upper limit value. The upper limit values and lower limit values of numerical ranges disclosed herein can be used alone or in any combination to specify an appropriate range.

The term "include" and the term "contain" herein mean that an additional component may be included or contained, and encompass the term "consisting essentially of" and the term "consisting of." The term "consisting essentially of" means that an additional component having substantially no adverse effect may be included. While the term "consisting of" means including only the described materials, but does not exclude inclusion of inevitable impurities.

The term "perpendicular" herein not only means to be accurately perpendicular, but encompasses being approximately perpendicular, and the term "parallel" not only means to be accurately parallel, but encompasses being approximately parallel. The term "on" herein encompasses both of "directly on" and "indirectly on" insofar as it is not especially specified in the context.

A hydrogen separation filter 1 according to an embodiment illustrated in FIG. 1 includes a porous substrate 20 and a super lattice layer 90 formed on the porous substrate 20. The super lattice layer 90 includes at least one lattice expansion layer 40 and at least two hydrogen dissociation and permeation layers 60. The lattice expansion layer 40 and the hydrogen dissociation and permeation layers 60 are alternately stacked. In this embodiment, the super lattice layer 90 may be formed directly on the porous substrate 20.

The porous substrate 20 may be made of, for example, a metal, a metal oxide, or a resin, and may be made of a metal oxide because of its high durability. Examples of metal oxide include aluminum oxide, zirconium oxide, and zeolite. Especially, aluminum oxide is used in some embodiments because it is inexpensive. The porous substrate 20 may have any shape such as a flat plate shape and a cylindrical shape.

The porous substrate 20 is provided with pores through which hydrogen is allowed to pass. The pores are closed by the super lattice layer 90. The porous substrate 20 may have an average pore diameter in a range of, for example, from 1 nm to 100 nm, or 1 nm to 10 nm in some embodiments. The average pore diameter in the above-described range allows the porous substrate 20 to have a sufficient hydrogen permeability while allowing the pores to be easily closed by the super lattice layer 90 without requiring the super lattice layer 90 to have an excessively large thickness. The average pore diameter may be less than $\frac{1}{7}$ of the thickness of the super lattice layer 90. Here, the average pore diameter of the porous substrate 20 is determined based on a pore diameter distribution obtained by mercury porosimetry according to JIS R 1655:2003. The mercury porosimetty is a method in which mercury is infiltrated into open pores by applying a pressure, a relation between a volume of the mercury infiltrated into the open pores and a pressure value applied at the time is obtained, and the obtained relation is used for determining the diameters of the open pores with Washburn's equation assuming that the open pores have columnar shapes.

The porous substrate 20 may have a porosity in a range of 30% to 50%. This allows the porous substrate 20 to have the sufficient hydrogen permeability while having a sufficient mechanical strength.

The super lattice layer 90 includes three or more layers of the lattice expansion layer 40 and the hydrogen dissociation and permeation layer 60 in total. From the perspective of manufacturability and the hydrogen separation performance, the total number of the lattice expansion layer 40 and the hydrogen dissociation and permeation layer 60 is 3 to 21 layers in some embodiments, 5 to 11 layers in some embodiments, and 5 to 9 layers in some embodiments. In this embodiment, the uppermost layer 92 (that is, the layer farthest from the porous substrate 20) of the super lattice layer 90 is the hydrogen dissociation and permeation layer 60, and the lowermost layer 94 (that is, the layer closest to the porous substrate 20) of the super lattice layer 90 is also the hydrogen dissociation and permeation layer 60.

The function of the super lattice layer 90 will be described. Hydrogen molecules dissociatively adsorb on a surface 93 of the uppermost layer 92 of the super lattice layer 90 and thereby hydrogen atoms are generated. The hydrogen atoms diffuse inside the super lattice layer 90, recombines in an interface 95 between the super lattice layer 90 and the porous substrate 20 to form hydrogen molecules, and leave the super lattice layer 90. Then, the hydrogen molecules pass through the porous substrate 20, and leave the hydrogen separation filter 1. This is how the hydrogen separation filter 1 selectively permeates hydrogen.

The super lattice layer 90 may have a thickness exceeding seven times the average pore diameter of the porous substrate 20. This allows the pores to be surely closed by the super lattice layer 90, which leads to a satisfactory hydrogen separation performance of the hydrogen separation filter 1. From the perspective of reducing raw material cost and production time of the hydrogen separation filter 1, the total thickness of the super lattice layer 90 may be 100 nm or less.

The lattice expansion layer 40 contains a first material. The hydrogen dissociation and permeation layer 60 contains a second material.

The second material is selected from the group consisting of Pd, V, Ta, Ti, Nb, and alloys thereof. Especially, Pd is appropriate as the second material because Pd has a high hydrogen dissociation and permeation capacity even at a low temperature of 300° C. or less.

The first material in the lattice expansion layer 40 has the same crystalline structure as the second material in the hydrogen dissociation and permeation layer 60, The first material in the lattice expansion layer 40 and the second material in the hydrogen dissociation and permeation layer 60 may have the same crystal orientation.

A first hulk material having the same composition and the same crystalline structure as the first material has a lattice constant $a_{1,bulk}$, a second bulk material having the same composition and the same crystalline structure as the second material has a lattice constant $a_{2,bulk}$, and the lattice constant $a_{1,bulk}$ and the lattice constant $a_{2,bulk}$ satisfy Formula (1):

$$1.03 a_{2,bulk} \leq a_{1,bulk} \leq 1.15 a_{2,bulk} \tag{1}$$

When the first material and the second material have the crystalline structure other than cubic system, the lattice constants along the same crystallographic axes of the first bulk material and the second hulk material satisfy the formula (1). Here, the bulk material means a completely relaxed material which is free-standing (i.e., not supported by another member). The first material and the second material having the same crystalline structure and the compositions satisfying the formula (1) can result in an average lattice constant $a_2$ of the second material in the hydrogen dissociation and permeation layer 60 larger than the lattice constant $a_{2,bulk}$ of the second bulk material.

For example, when the second material is Pd having a face-centered cubic (fcc) structure, the first material may be Al, Au, or Ag having the fcc structure, and may be especially Ag because Ag is relatively inexpensive and less likely to be oxidized. When the second material is V having a body-centered cubic (bcc) structure, the first material may be Mo, W, or Nb having the bcc structure. When the second material is Ta having the bcc structure, the first material may be V, Mo, W, or Nb having the bcc structure. Table 1 illustrates the lattice constants of the bulk materials of these metals.

TABLE 1

| Metal | Crystalline Structure | Lattice Constant of Bulk Material [nm] |
|---|---|---|
| Pd | fcc | 0.38898 |
| Al | fcc | 0.40496 |
| Au | fcc | 0.40786 |
| Ag | fcc | 0.40862 |
| Ta | bcc | 0.28665 |

TABLE 1-continued

| Metal | Crystalline Structure | Lattice Constant of Bulk Material [nm] |
|---|---|---|
| V | bcc | 0.30300 |
| Mo | bcc | 0.31399 |
| W | bcc | 0.31560 |
| Nb | bcc | 0.32941 |

The average lattice constant $a_2$ of the second material in the hydrogen dissociation and permeation layer 60 satisfies Formula (2):

$$a_{2,bulk} < a_2 \quad (2).$$

In some embodiments, the average lattice constant $a_2$ of the second material may satisfy Formula (3):

$$1.5 \leq [(a_2 - a_{2,bulk})/a_{2,bulk}] \times 100 \leq 5 \quad (3).$$

In some embodiments, the average lattice constant $a_2$ of the second material may satisfy Formula (4):

$$3 \leq [(a_2 - a_{2,bulk})/a_{2,bulk}] \times 100 \leq 5 \quad (4).$$

In some embodiments, the average lattice constant $a_2$ of the second material may satisfy Formula (5):

$$3.5 \leq [(a_2 - a_{2,bulk})/a_{2,bulk}] \times 100 \leq 4.5 \quad (5).$$

Here, the average lattice constant $a_2$ of the second material can be determined from a plane spacing between crystal planes perpendicular to an interface 62 between the lattice expansion layer 40 and the hydrogen dissociation and permeation layer 60. In detail, electron diffraction patterns of the second material are obtained in three positions, two of which are positions in or in the vicinity of both surfaces (i.e., upper surface and lower surface) of each of the hydrogen dissociation and permeation layers 60 and the rest of which is an intermediate position between the upper surface and the lower surface of each of the hydrogen dissociation and permeation layers 60 by using a transmission electron microscope (TEM). Based on each of the electron diffraction patterns, the lattice constants are determined from the plane spacing between the crystal planes perpendicular to the interface 62 between the lattice expansion layer 40 and the hydrogen dissociation and permeation layer 60. The determined lattice constants are averaged to produce the average lattice constant $a_2$ of the second material. Formula (2) described above indicates that a crystal lattice of the second material in the hydrogen dissociation and permeation layer 60 is expanded at least in a direction parallel to the interface 62 compared with a fully relaxed state of the crystal lattice. The crystal lattice of the second material in the hydrogen dissociation and permeation layer 60 may be expanded also in a direction perpendicular to the interface 62. In a conventional hydrogen separation filter such as the one described in WO 2011/122414, diffusion of hydrogen in the hydrogen dissociation and permeation layer at a low temperature causes the crystal lattice of the hydrogen dissociation and permeation layer to be repeatedly expanded and contracted, which results in embrittlement. However, in the hydrogen separation filter 1 according to the embodiment, the expanded crystal lattice of the hydrogen dissociation and permeation layer 60 reduces the expansion and contraction of the crystal lattice due to the hydrogen diffusion, and thereby preventing or reducing the embrittlement of the hydrogen dissociation and permeation layer 60 at a low temperature. Thus, the hydrogen separation filter 1 according to the embodiment allows hydrogen purification at a lower temperature than a conventional one.

Each of the lattice expansion layers 40 and the hydrogen dissociation and permeation layers 60 may have a thickness in a range of 1 nm to 10 nm, 2 nm to 8 nm in some embodiments, or 4 nm to 6 nm in some embodiments. These thicknesses prevent or reduce alloy formation of the first material and the second material and allow the crystal lattice of the hydrogen dissociation and permeation layer 60 to be sufficiently expanded.

An exemplifying method for manufacturing the hydrogen separation filter 1 according to this embodiment will be described. The second material and the first material are alternately deposited on the porous substrate 20 by a sputtering method. Accordingly, the super lattice layer 90 constituted of the hydrogen dissociation and permeation layers 60 and the lattice expansion layers 40 alternately stacked is formed on the porous substrate 20. Thus, the hydrogen separation filter 1 according to this embodiment is obtained.

The present disclosure is not limited to the above-described embodiment, and various kinds of changes of design are allowed within a range not departing from the spirits of the present disclosure described in the claims.

EXAMPLES

While the following specifically describes the present disclosure by examples, the present disclosure is not limited to these examples.

(1) Production of Hydrogen Separation Filter

Example 1

A ceramic membrane filter ("Cefilt" manufactured by NGK INSULATORS, LTD., ultrafiltration membrane, cutoff molecular weight 20000, average pore diameter 5 nm, hereinafter, simply referred to as a "substrate") was placed in a deposition chamber of a sputtering apparatus provided with a pure Ag target and a pure Pd target. After the surface of the substrate was cleaned by Ar-ion etching, a Pd layer having a 5 nm thickness was formed on the substrate, and subsequently, an Ag layer having a 5 nm thickness was formed by the sputtering method. Similarly, the firming of the Pd layer and the forming of the Ag layer were alternately repeated, and thus a super lattice layer constituted of four Pd layers and three Ag layers was formed on the substrate. The thickness of the super lattice layer was approximately 35 nm in total. Thus, the hydrogen separation filter (hereinafter, simply referred to as the "filter") was produced.

Comparative Example 1

After the surface of the substrate was cleaned by Ar-ion etching similarly to Example 1, a Pd layer having a 35 nm thickness was formed on the substrate by the sputtering method. Thus, the hydrogen separation filter (hereinafter, simply referred to as the "filter") was produced.

(2) Measurement of Lattice Constant

A TEM was used for obtaining electron diffraction patterns of the Pd layer in three positions, two of which were positions in or in the vicinity of both surfaces of each of the Pd layers of the filter of Example 1 and the rest of which was an intermediate position between the both surfaces. Based on each of the twelve electron diffraction patterns obtained, the Pd lattice constants were determined from plane spacings between crystal planes perpendicular to the interface between the Pd layer and the Ag layer, and an average value $a_{pd}$ thereof was calculated. The average lattice constant $a_{pd}$ was approximately 1.04 times as large as the bulk Pd lattice constant $a_{pd,bulk}$ (0.38898 nm).

Similarly, electron diffraction patterns of the Pd layer were obtained in three places, two of which were positions in or in the vicinity of both surfaces of the Pd layer of the filter of Comparative Example 1 and the rest of which was an intermediate position between the both surfaces. Based on the obtained electron diffraction patterns, the Pd lattice constants were determined from plane spacings between crystal planes perpendicular to the surface of the Pd layer, and an average value $a_{pd}$ thereof was obtained. The average lattice constant $a_{pd}$ was approximately 1.00 times as large as the bulk Pd lattice constant $a_{pd,bulk}$ (0.38898 nm).

(3) Evaluation of Hydrogen Separation Performance

In compliance with JIS K7126: 2006 (Plastics-Film and sheeting-Determination of gas-transmission rate-Part 1: Differential-pressure method), hydrogen gas transmission rates and nitrogen gas transmission rates (unit: $mol \cdot m^{-2} \cdot s^{-1} \cdot Pa^{-1}$) of the filters of Example 1 and Comparative Example 1 were measured under a condition at 100° C. by a gas chromatography method. A ratio of the hydrogen gas transmission rate to the nitrogen gas transmission rate (that is, hydrogen gas transmission rate/nitrogen gas transmission rate) of the filter of Example 1 was 3519. A ratio of the hydrogen gas transmission rate to the nitrogen gas transmission rate of the filter of Comparative Example 1 was 4. It was shown that, under the low temperature of 100° C., the filter of Example 1 exhibited a significantly higher hydrogen separation performance than that exhibited by the filter of Comparative Example 1.

What is claimed is:

1. A hydrogen separation filter comprising:
   a porous substrate; and
   a super lattice layer on the porous substrate,
   wherein the super lattice layer comprises:
      at least one lattice expansion layer containing a first material; and
      at least two hydrogen dissociation and permeation layers containing a second material selected from the group consisting of Pd, V, Ta, Ti, Nb, and alloys thereof,
   wherein the at least one lattice expansion layer and the at least two hydrogen dissociation and permeation layers are alternately stacked,
   wherein the first material and the second material have a same crystalline structure, and
   wherein a lattice constant $a_{1,bulk}$ of a first bulk material having a same composition and a same crystalline structure as the first material and a lattice constant $a_{2,bulk}$ of a second bulk material having a same composition and a same crystalline structure as the second material satisfy Formula (1):

$$1.03 a_2 \leq a_{1,bulk} \leq 1.15 a_{2,bulk} \quad (1).$$

2. The hydrogen separation filter according to claim 1, wherein the super lattice layer comprises an uppermost layer that is farthest from the porous substrate and a lowermost layer that is closest to the porous substrate, both of the uppermost layer and the lowermost layer being the hydrogen dissociation and permeation layers.

3. The hydrogen separation filter according to claim 1, wherein the second material has an average lattice constant $a_2$ satisfying Formula (2):

$$a_{2,bulk} < a_2 \quad (2),$$

the average lattice constant $a_2$ being determined from a plane spacing between crystal planes perpendicular to an interface between the lattice expansion layer and the hydrogen dissociation and permeation layer.

4. The hydrogen separation filter according to claim 1, wherein the second material has an average lattice constant a 2 satisfying Formula (3):

$$1.5 \leq [(a_2 - a_{2,bulk})/a_{2,bulk}] \times 100 \leq 5 \quad (3),$$

the average lattice constant $a_2$ being determined from a plane spacing between crystal planes perpendicular to an interface between the lattice expansion layer and the hydrogen dissociation and permeation layer.

5. The hydrogen separation filter according to claim 1, wherein each of the lattice expansion layer and the hydrogen dissociation and permeation layers has a thickness in a range of 1 nm to 10 nm.

6. The hydrogen separation filter according to claim 1, wherein the first material is Ag, Au, or Al, and wherein the second material is Pd.

7. The hydrogen separation filter according to claim 6, wherein the first material is Ag.

8. The hydrogen separation filter according to claim 1, wherein the super lattice layer has a thickness exceeding seven times an average pore diameter of the porous substrate.

* * * * *